June 10, 1958 L. F. SAMLER 2,838,084
SCREEN CHANGING METHOD FOR CONDUITS AND TUBES FOR
CONVEYING FLUIDS AND FOR EXTRUSION MACHINES
Filed Aug. 8, 1956 3 Sheets-Sheet 1

INVENTOR
Lee F. Samler,

BY Karl W. Flocks
ATTORNEY

June 10, 1958 L. F. SAMLER 2,838,084
SCREEN CHANGING METHOD FOR CONDUITS AND TUBES FOR
CONVEYING FLUIDS AND FOR EXTRUSION MACHINES
Filed Aug. 8, 1956 3 Sheets-Sheet 2

INVENTOR
Lee F. Samler

BY Karl W. Flocks
ATTORNEY

June 10, 1958 L. F. SAMLER 2,838,084
SCREEN CHANGING METHOD FOR CONDUITS AND TUBES FOR
CONVEYING FLUIDS AND FOR EXTRUSION MACHINES
Filed Aug. 8, 1956 3 Sheets-Sheet 3
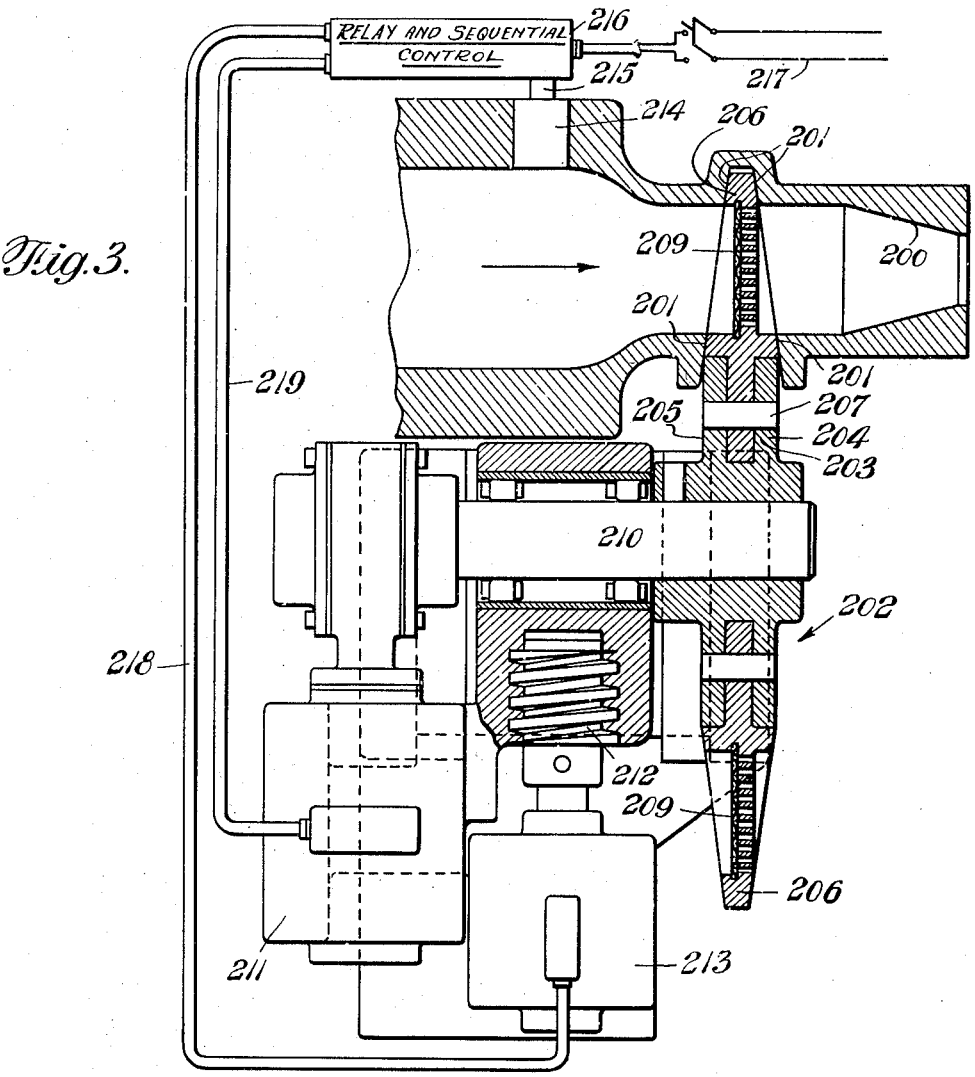
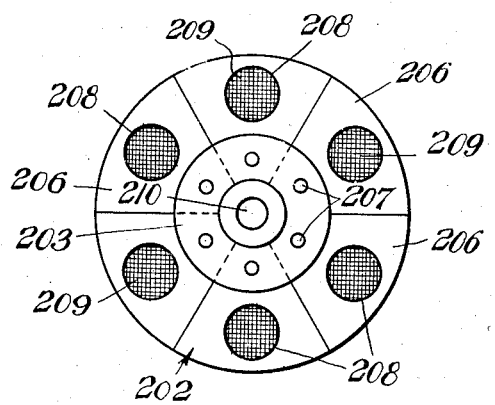
INVENTOR
Lee F. Samler,
BY Karl W. Flocks
ATTORNEY

United States Patent Office 2,838,084
Patented June 10, 1958

2,838,084

SCREEN CHANGING METHOD FOR CONDUITS AND TUBES FOR CONVEYING FLUIDS AND FOR EXTRUSION MACHINES

Lee F. Samler, Baltimore, Md., assignor to The National Plastic Products Company, Odenton, Md., a corporation of Maryland Application August 8, 1956, Serial No. 602,786

9 Claims. (Cl. 146—242)

This invention relates to a method and apparatus for screening impurities in tubes, conduits and extrusion machines and more particularly for sealing and unsealing and changing screens in conduits and tubes through which fluid more or less under pressure flows such as, for example, in extrusion machines.

The instant application is a continuation-in-part of copending application Serial No. 293,024 filed June 11, 1952, now Patent No. 2,763,308, and of copending application Serial No. 387,164 filed October 20, 1953, now Patent No. 2,786,504.

In applicant's aforesaid copending applications, it has been pointed out that in the construction of an extrusion machine a strainer or screen is positioned between the extruder die and screw. The primary purpose of the screen is to remove foreign particles from the extrudable material before the die is reached, thereby eliminating possible defects in the finished extruded product. During the operation of the extruder, it is necessary to change the extruder screen from time to time since the screen has a tendency to collect foreign matter rapidly. Unless the screen is changed at intervals, the continued use thereof will result in clogging and thereby cause the eventual shut-down of the extruding apparatus.

Prior to the instant invention, it was necessary, in order to change a screen for use in an extruding apparatus, to completely shut down the machine, remove the die, and then replace the screen. This operation not only resulted in a considerable loss of time and labor, but, moreover, the overall production time of the machine was materially decreased.

In order to overcome the defects in the heretofore known fluid-flow, such as extrusion apparatus and the like, in changing screens, the present invention includes a system which is controlled automatically to effect the changing of the screen without shutting down the operation of the machine. By automatically controlling the screen changing operation, the extruder machine need not be shut down and the complete screen changing operation may be effected with a minimum of effort.

It is, therefore, an object of the present invention to provide screen changing apparatus for use in an extruder or other conduit system that may automatically effect the replacement of a screen without discontinuing the operation of the system or extruder.

Another object of the present invention is to provide automatic control means operatively connected to screen changing apparatus for effecting the changing of a screen.

It is another object of the present invention to provide a screen for use in an extruder that may be replaced without discontinuing the operation of the extruder.

Still another object of the present invention is to provide apparatus for simply and quickly removing a contaminated screen and inserting a new screen in an extrusion machine.

It is still another object of the invention to provide for the automatic changing of screens in response to pressure built up in the system due to clogging of the screen in position within the conduit or tube or extruding machine.

Other objects and the nature and advantages of the instant invention will be apparent from the following description taken in conjunction with the accompanying drawings, wherein:

Fig. 1 is a vertical sectional view illustrating the present invention;

Fig. 3 is a fragmentary schematic representation of a modified form of the invention with parts in elevation and parts shown in vertical section; and Fig. 4 is a view in elevation of a portion of the screen changing device shown in Fig. 3.

Figure 2:
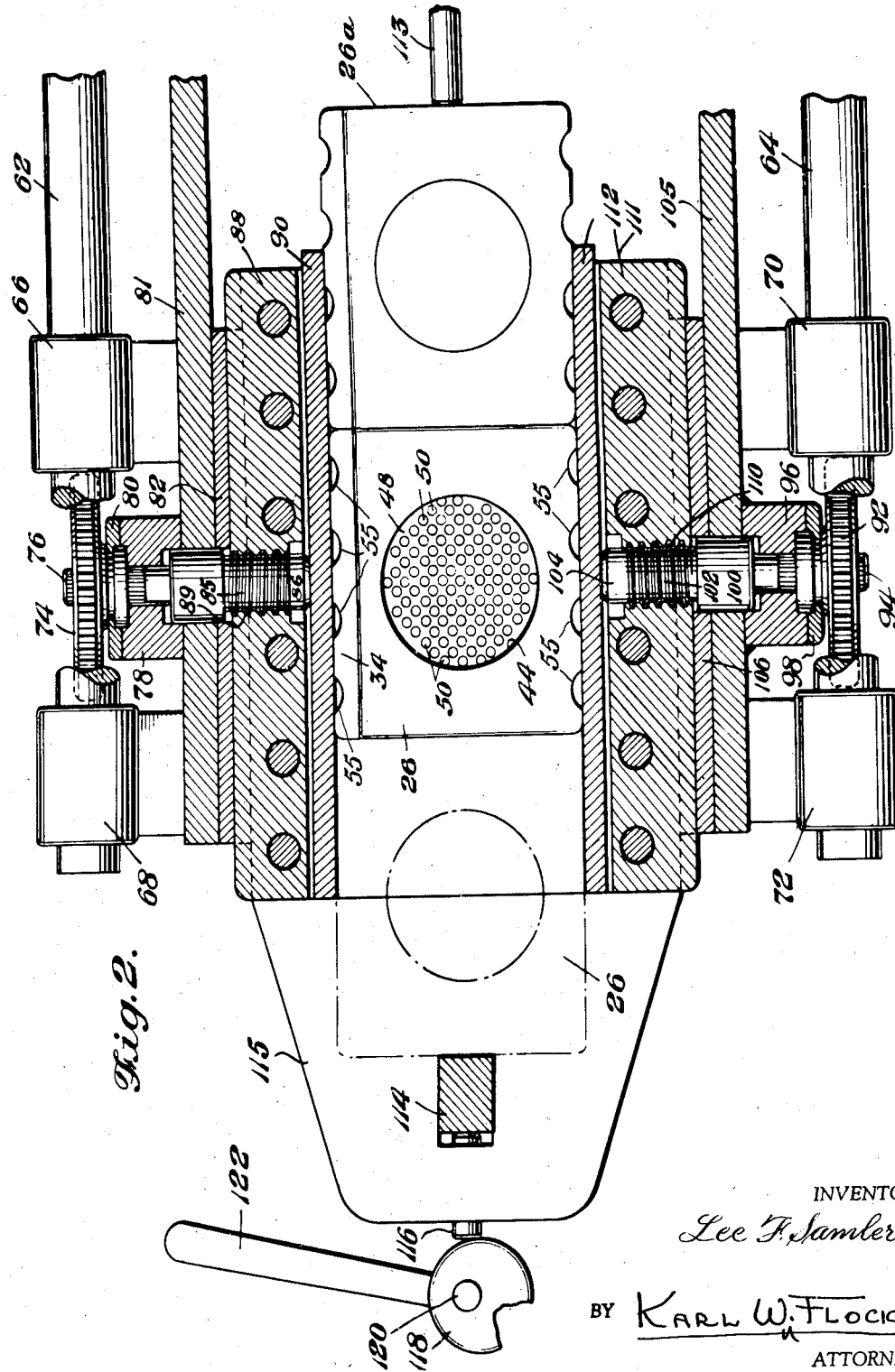
Fig. 2 is a view taken along the line 2—2 of Fig. 1.

Referring to the drawings, and particularly to Fig. 1, a screen housing assembly is indicated generally at 10 and includes a body portion 12, which is formed integral with a tubular neck section 14. The neck section 14 has suitably secured thereto a head member 16 which is mounted on an extruder cylinder (not shown) by a series of stud bolts 18. The extruder cylinder, which houses the usual extruder screw member, registers with the neck section 14 and the cylinder bore is thereby adapted to communicate with a bore 20 formed in the neck section 14. The bore 20 extends inwardly from the neck section 14 into the reduced bore 21 formed in the body portion 12. Suitably secured in the body portion 12 and extending across the reduced bore 21 is a pair of ring members 22, 24 having tapered inner faces. The ring members 22, 24 are formed with their inner diameters equal to the diameter of the reduced bore 21 and are adapted to have seated between the tapered inner faces thereof a tapered screen frame 26 which, as shown in Fig. 2, comprises a plate-like cast member tapering into a relatively narrow bottom portion 28. The bottom portion 28 slidably fits between the ring members 22, 24 and projects into an opening 30 formed as an extension of a recess 32 located in the body portion 12. Formed on the upper end of the screen frame 26 is a reduced portion 34 which is guided into a recess 36 formed in the body portion 12 by a pair of oppositely disposed projections 38, 40 formed as part of the body portion 12.

As shown in Fig. 2, the tapered screen frame 26 has formed therein a cut-out section 44 which is circular in configuration and which has a diameter equal to the bore 21. Formed integral with the body of the screen frame 26 and disposed in the cut-out section 44 is a plate 48 having openings 50 formed therein. Also disposed in the circular cut-out section 44 and positioned adjacent the plate 48 is a screen 52 which is adapted to filter out foreign matter from the extrudable material as it is advanced through the bore 21. The screen 52 is locked in position in suitable grooves 54, which are formed in the screen frame 26. Cut out from the bottom portion 28 and upper reduced portion 34 of the screen frame 24 is a series of grooves 55 adapted to reduce the sliding area of the screen frame 24, thereby enabling the screen frame to be easily and slidably moved into position between the rings 22, 24.

Suitably secured to the body portion 12 is a die attaching head 56 which has formed therein a diverging bore 58. The bore 58 registers with the bore 21 in the body portion 12 and communicates with a suitable die (not shown) which is adapted to be secured to the die attaching head 56 by hinged bolts 60.

When the extruding machine has been in operation a sufficient length of time to collect a prohibitive amount of foreign matter in the screen 52, it is necessary to replace the screen. It is apparent that if the screen is not replaced at this time, it will become clogged which will cause the flow of material therethrough to lessen and will eventually result in the shut-down of the machine, In order to avoid shutting down the machine during the screen replacing operation, thereby resulting in considerable loss of time and labor, the present invention incorporates a screen replacing mechanism that efficiently and quickly accomplishes the change of screens in a matter of seconds and during the normal operation of the machine. Since screen 52 is securely locked in the tapered screen frame 26, it is necessary to replace the entire screen frame 26 which will, in effect, change the screen. As shown in Fig. 1, the tapered screen frame 26 is firmly positioned between the ring members 22, 24 in the body portion 12. It is apparent that by moving the tapered screen frame 26 upwardly, it will become loosened and can then be slidably removed from the body portion 12. Referring now to Figs. 1 and 2, the mechanism for replacing the screen is illustrated and includes oppositely disposed racks 62, 64. The rack 62 is reciprocated by suitable power means (not shown) and is supported by spaced bearing posts 66, 68. Similarly, rack 64 is reciprocated by suitable power means (not shown) and is supported by spaced bearing posts 70, 72. The rack 62 engages a gear 74 which is splined to a reciprocable shaft 76 rotating in a bearing 78. The gear 74 is prevented from endwise movement by a ring 80 located adjacent the bearing 78. A frame member 81 supports the bearing 78 and has disposed thereunder in abutting relation thereto a spacer 82. The spacer 82 snugly fits on the body portion 12 and is secured thereto along with the frame member 81 by stud bolts 83. The shaft 76 has integrally connected thereto an enlarged portion 84 which extends through the frame member 81 and spacer 82 and incudes a threaded portion 85 and an end portion 86. Secured in the recess 36 is a stationary elongated bar 88 which has a threaded opening 89 formed therein. The threaded portion 85 of the shaft 76 is threadedly engaged in the opening 89 while the end portion 86 of the shaft 76 abuts against an upper pressure bar 90. The upper pressure bar 90 is also disposed in the recess 36 and contacts therein the reduced portion 34 of the screen frame 26. It is apparent that end portion 86 is raised from or lowered against the upper pressure bar 90 by actuating the suitable power means which moves the rack 62. Upon movement of the rack 62, the gear 76 rotates which causes the shaft 76 to rotate. The threaded portion 85 of the shaft 76 then rotates in the stationary elongated bar 88. The effect of this movement is to cause the shaft 76 to move vertically with respect to the bar 88, thereby varying the vertical position of the end portion 86.

The operating mechanism associated with the rack 64 is similar to that described hereinabove and includes a gear 92 engaging the rack 64. A reciprocable shaft 94 is splined to the gear 92 and rotates in a bearing 96. A retaining ring 98 secured to the gear 92 prevents endwise movement thereof. The shaft 94 includes an enlarged portion 100 which has a threaded portion 102 and an end portion 104 formed thereon. The enlarged portion 100 extends through a frame member 105 and a spacer 106, both of which are secured to the body portion 12 by stud bolts 108. The threaded portion 102 engages a threaded opening 110 formed in a stationary elongated bar 111 located in recess 32 and the end portion 104 contacts a lower pressure bar 112 also disposed in the recess 32. The pressure bar 112, in turn, abuts against the bottom portion 28 of the tapered screen frame 26 and is adapted to cause vertical movement thereof when it is desired to replace the screen frame.

The operation of the device shown in Figs. 1 and 2 is as follows:

The material to be extruded is forced into the bore 20 from the extruder cylinder by the extruder screw. The material passes into reduced bore 21 and then through the screen frame 26 at which point any foreign matter present in the extrudable material is strained by the screen 52 and plate 48. The plate 48 supports the screen 52 during the straining operation, thereby preventing the tearing thereof due to the pressure exerted by the cylinder screw. The strained material passes into bore 58 and then into the die, which is secured adjacent thereto.

After the extrusion apparatus has been in operation for a certain period of time, the screen 52 and plate 48 will begin to become clogged. It is then necessary to replace the screen frame 26 with a clean screen frame. Without shutting down the machine, the racks 62 and 64 are moved simultaneously by power means (not shown). However, it is apparent that the power means for the racks 62, 64 may be individually controlled or operated by a single control. When the racks 62, 64 are moved, the gears 74 and 92 are rotated, which causes the shafts 76 and 94 to be moved in a vertical direction a slight amount. If the screen frame 26 is to be replaced, the rack 64 moves in a direction to cause the gear 92 to force the shaft 94 upwardly. Similarly, the rack 62 is moved in a direction to cause gear 74 to move the shaft 76 upwardly, the distance of the upward movement of shaft 76 corresponding to the distance of the upward movement of the shaft 94. It is understood that the shafts 76, 94 are only moved that amount that will cause the tapered screen frame 26 to become loosened from between the ring members 22, 24. As the shaft 94 moves upwardly, the end portion 102 forces the lower pressure bar 112 firmly against the bottom portion 28 of the screen frame 26. Further upward movement of the shafts 76 and 94 causes the lower pressure bar 112 to lift the screen frame 26 from its wedged position between the ring members 22, 24.

When the screen frame 26 is moved upwardly enough to cause it to slide freely, a new screen frame is slidably moved by a bar 113 (Fig. 2) which is actuated by suitable power means (not shown). The bar 113 forces the new screen frame into position in the body portion 12 between ring members 22, 24 and in so doing moves the used screen frame out of the body portion for disposal thereof. The correct aligned position of the new screen frame is assured by mounting a stop bar 114 in a housing 115, which is secured to the screen housing assembly 10. The stop bar 114 is controlled by a plunger 116 which is actuated by a cam 118 mounted on a shaft 120.

A handle 122 is provided for manually adjusting the cam 118, which actuates the plunger 116, thereby controlling the position of the stop bar 114. It is apparent that the stop bar 114 will limit the movement of the ejected screen frame which is forced from the position between the ring members 22, 24 by the new screen. Referring to Fig. 2, the positions of the screen frame are illustrated before and after the screen frame replacing operation. A new screen frame 26a is positioned adjacent the old screen frame 26 and is adapted to be moved transversely by the bar 113. When the screen frame 26 is loosened from its wedged position, the bar 113 is actuated to quickly move the screen frame 26a between the ring members 22, 24 and, in so doing, move the screen frame 26 to the position abutting the stop bar 114 shown in dotted lines in Fig. 2. When the screen frame 26 reaches the stop bar 114, the new screen frame 26a is in the correct aligned position.

The screen changing operation is completed by removing the screen frame 26 from the screen housing assembly 10 and actuating the racks 62, 64 to move the shafts 76 and 94 downwardly. Downward movement of the shaft 76 forces the upper pressure bar 90 downwardly against the reduced portion 34 of the new screen frame 26a, thereby wedging the tapered screen frame 26a firmly between the ring members 22, 24. It will be apparent from Fig. 2 that as the screen frames are interchanged, a portion of one of the screens locked in the screen frames 26, 26a will register with the bore 21 at all times, thus assuring a continuous flow of material through the bore 21. As the screen frame shifting and replacing operation described hereinabove is accomplished, it is essential that a minimum leakage of material be allowed. Moreover, it is important to seat the new screen frame 26a between the tapered rings 22, 24 so that there is no possible point of leakage. Thus, even though the screen changing operation is performed under high pressures, a leakproof seal is accomplished. It is apparent that unless the new screen be seated properly, leakage of the material would result which would also cause local points of material stagnation. This condition on continued operation would cause material decomposition which would, in many cases, have a deleterious effect on the extruded product.

From the above description, it is apparent that a new screen frame may be put into operation quickly, efficiently and with a minimum of effort. The actual screen frame replacing operation is performed in a matter of seconds, obviating the necessity of shutting down the extrusion machine and thereby materially conserving valuable time and labor so vital in large production plants.

Referring to Figs. 3 and 4, the tubular passage 200, through which fluid under more or less pressure is adapted to flow in the direction of the arrow, is provided with walls 201 forming a wedge-shaped slot. Cooperating with said walls 201 is the vertically movable and rotatable disc 202 which is provided with a central portion 203 having parallel faces 204, 205 which form the inner section of said disc. The outer section of said disc is formed of a plurality of contiguous generally pie-shaped and wedge-shaped frame sections 206. Each wedge-shaped frame section 206 is removably pinned at 207 to the central portion 203.

Each wedge-shaped frame section 206 is provided with walls 208 forming a circular frame-like opening for a screen element 209.

The disc 202 is fixed to the shaft 210 and said shaft 210 is adapted to be rotated through predetermined arcs by motor 211. While electrical means have been shown for operating the motor 211, it is to be understood that the motor 211 may also be a mechanical motor or a hydraulic motor or the like.

The shaft 210 is also arranged to be moved upwardly and downwardly by the screw 212 which is operated by the motor 213. While electrical means have been shown for operating the motor 213, it is to be understood that the motor 213 may be a mechanical motor or a hydraulic motor or the like.

Located in association with the interior of the tubular passage 200, which may be the cylinder of an extrusion machine, is the pressure responsive means 214 which is connected by conduit 215 to the relay and sequential control system 216. The relay and sequential control system 216 is adapted to be connected to a power source 217 and by cable system 218 to motor 213 and by cable system 219 to motor 211.

In the operation of the device described in Figs. 3 and 4, as the fluid passes through the passageway 200, and impurities or particles are screened out by the screen 209, which is in place within the passageway 200 in operative position, the pressure within the tubular passageway 200 will build up and when a predetermined pressure is reached, the pressure responsive means 214 will act through the conduit 215 to operate the relay and sequential control system in such fashion that first the motor 213 will rotate the screw 212 for a predetermined amount and in a predetermined direction to lower the shaft 210 and thereby lower the frame section 206 which is in operative sealing position within the passageway 200, so that the frame section 206 is unsealed from the tapered walls 201 and thereafter the relay and sequential control system will cause the motor 211 to operate for a predetermined amount to cause the rotation of the shaft 210 so that the clogged screen 209 within the frame section 206 will move transversely of the flow of the fluid through the passageway 200 and a second and adjacent clean screen 209 will move transversely into position within the passageway 200 and when this phase of the operation has been reached, the motor 213 will again operate in the reverse direction to cause the shaft 210 to move upwardly and seal the new frame section 206 within the walls 201 and thus present in sealed relation to the passageway 200 a fresh screen 209 whereupon the flow of clean fluid through the passageway 200 will proceed substantially uninterrupted and without loss of time or efficiency.

Thus, it will be understood that in accordance with the invention, there is provided a completely automatic mechanism for changing screens and for unsealing screen frames and sealing screen frames, as well as for changing the screens. Screen frames may be removed from inoperative positions when the disc 202 presents an unclean screen at the bottom thereof which unclean screen may be cleaned and reinserted. While the relay and sequential control system 216 and the connections 218 and 219 and motors 213 and 211 have been shown diagrammatically, the mechanisms involved will readily be understood by those skilled in the art, particularly in view of the disclosures in applicant's copending applications Serial No. 293,024, now Patent No. 2,763,308, and Serial No. 387,154, now Patent No. 2,786,504.

It will be obvious to those skilled in the art that various changes may be made without departing from the spirit of the invention and, therefore, the invention is not limited to what is shown in the drawings and described in the specification, but only as indicated in the appended claims.

What is claimed is:

1. In a method of changing a screen disposed in a seated position in a body portion, comprising the steps of moving said screen upwardly in a vertical direction to an unseated position, shifting said screen in a horizontal direction to move said screen out of the screen operating position, and simultaneously shifting a replacement screen into the screen operating position to replace the first-named screen.

2. In a method of changing a screen disposed in a seated position in a body portion, comprising the steps of moving said screen upwardly in a vertical direction to an unseated position, shifting said screen in a horizontal direction to move said screen out of the operative position and simultaneously shifting a replacement screen into the screen operating position to replace the first-named screen, and moving said replacement screen downwardly in a vertical direction, thereby locking said replacement screen in the screen operating position.

3. In a method of providing continuous operation of an apparatus whereby a fluid medium is moved through said apparatus in a substantially continuous manner, comprising the steps of screening said fluid medium to remove impurities therefrom, removing the screened material from said apparatus by bodily replacing the means for screening the fluid medium, the replacing step including moving the screening means from a sealed position to an unsealed position, moving the screening means from the unsealed position to an inoperative position and simultaneously moving a replacement screening means to the unsealed position, thereafter moving said replacement screening means to the sealed position to continuously and effectively screen said fluid medium moving through said apparatus.

4. In a method of changing a screen disposed in a sealed position in a body portion having a longitudinal axis, comprising the steps of moving said screen in a direction transverse to the longitudinal axis of said body portion to an unsealed position, shifting said screen in a direction transverse to the unsealing movement to move said screen out of screening position, and simultaneously shifting a replacement screen into screening position.

5. In a method of changing a screen that is adapted to screen impurities from a fluid medium flowing through a body portion, said screen being disposed in a sealed position in said body portion during the screening operation, comprising the steps of moving said screen in a direction transverse to the flow of fluid to an unsealed position, shifting said unsealed screen in a direction transverse to the flow of fluid and transverse to the unsealing movement to a post position and simultaneously shifting a replacement screen into screening position, and applying a force on said replacement screen in a direction transverse to the flow of fluid to seal said replacement screen in the screening position.

6. In a method of providing continuous flow of clean fluid medium through a passageway, comprising screening said fluid medium to remove impurities therefrom and removing the screened material, said last-mentioned step including moving a screen in a direction transverse to the flow of fluid from a sealed position with respect to said passageway to an unsealed position, moving the screen in a direct transverse to the unsealing movement from the unsealed position to a post position and simultaneously moving a replacement screen to the unsealed position, thereafter moving said replacement screen in a direction transverse to the flow of fluid to the sealed position to continuously and effectively screen said fluid medium moving through said passageway.

7. In a method of providing continuous operation of a thermoplastic extruder whereby a thermoplastic material is moved through said extruder in a substantially continuous manner and a screen is disposed in said extruder for removing impurities from said thermoplastic material, including replacing the screen, the replacing method comprising the steps of moving the screen in a direction transverse to the flow of said thermoplastic material from a sealed position to an unsealed position in said extruder, moving the screen from the unsealed position to a post position and simultaneously moving a replacement screen to the unsealed position, thereafter moving said replacement screen in a direction transverse to the flow of thermoplastic material to the sealed position to continuously and effectively screen said thermoplastic material moving through said extruder.

8. In a method of sealing a screen in a thermoplastic extruder, comprising the steps of moving said screen into communication with the flow of thermoplastic material through said extruder, and applying a force to said screen in a direction generally transverse to the flow of said thermoplastic material, one component of said force being generally parallel to the flow of material thereby forcing said screen into the sealed position.

9. In a method of sealing a screen in a thermoplastic extruder, comprising the step of applying a force to said screen in a direction transverse to the flow of thermoplastic material through said extruder to wedge said screen into contact with said extruder thereby sealing said screen in said extruder.

References Cited in the file of this patent

UNITED STATES PATENTS

| | | |
|---|---|---|
| 2,152,900 | Manning | Apr. 4, 1939 |
| 2,152,902 | Manning | Apr. 4, 1939 |
| 2,763,308 | Samler | Sept. 18, 1956 |
| 2,786,504 | Samler | Mar. 26, 1957 |

FOREIGN PATENTS

| | | |
|---|---|---|
| 263,592 | Great Britain | Jan. 6, 1927 |